(12) United States Patent
Zhu et al.

(10) Patent No.: US 10,739,755 B1
(45) Date of Patent: Aug. 11, 2020

(54) INDUSTRIAL MACHINE OPTIMIZATION

(71) Applicant: Baker Hughes Oilfield Operations LLC, Houston, TX (US)

(72) Inventors: Dehao Zhu, Tulsa, OK (US); Stanley Thomas Denney, Magnolia, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 8 days.

(21) Appl. No.: 16/263,858

(22) Filed: Jan. 31, 2019

(51) Int. Cl.
  *G06F 3/0482* (2013.01)
  *G05B 19/408* (2006.01)
  *G06F 16/9038* (2019.01)
  *G06F 16/9032* (2019.01)

(52) U.S. Cl.
  CPC ......... *G05B 19/408* (2013.01); *G06F 3/0482* (2013.01); *G06F 16/9038* (2019.01); *G06F 16/90324* (2019.01)

(58) Field of Classification Search
  CPC .............................. G06N 20/00; G06F 3/0482
  See application file for complete search history.

(56) References Cited

U.S. PATENT DOCUMENTS

| | | | | |
|---|---|---|---|---|
| 6,178,393 | B1* | 1/2001 | Irvin | F04D 15/0066 |
| | | | | 700/282 |
| 6,666,049 | B1* | 12/2003 | Katende | F25J 3/0223 |
| | | | | 62/656 |
| 2016/0283254 | A1* | 9/2016 | Hill | G06Q 10/06 |
| 2017/0030359 | A1* | 2/2017 | Fowler | F04D 27/0261 |

* cited by examiner

*Primary Examiner* — Mark A Connolly
(74) *Attorney, Agent, or Firm* — Mintz Levin Cohn Ferris Glovsky and Popeo, P.C.

(57) ABSTRACT

In one implementation, a method can include receiving historical data characterizing a detected operational characteristic of a first industrial machine of a plurality of industrial machines in a cluster. The method can also include determining an operational envelop associated with the first industrial machine from the historical data. The operational envelop can be indicative of a range of values of an operating parameter of the first industrial machine. The method can further include determining an operating parameter recommendation, the determining can include using the operational envelop and a user input as operational constraints associated with one or more of the plurality of industrial machines. The method can also include rendering, in a graphical user interface display space, a visual representation of the operating parameter recommendation.

20 Claims, 4 Drawing Sheets

Frm tools 247 ESP cluster optimization

| Select | Well | Well id | WC | Freq | Ptbg | Max freq | Min freq | Min ptbg | New freq | New ptbg | New oil | New water |
|---|---|---|---|---|---|---|---|---|---|---|---|---|
| ☐ | c54 | 11906 | | | | | | | | | | |
| ☒ | c33 | 11911 | 93 | 45.11 | | 45.74 | 40.11 | 190 | 44.8047.. | 190 | 1057.80.. | 14053.6.. |
| ☒ | C32 | 11916 | 93 | 42.13 | | 45.96 | 37.13 | 180 | 42.9736.. | 180 | 996.143.. | 13234.7.. |
| ☐ | c41 | 11907 | 88 | 47 | | 47.62 | 42 | 206 | 47.62 | 206 | 1595.95.. | 11437.8.. |

| Constraint | Value | Units |
|---|---|---|
| Water handling capacity | 39129.5999 | BPD |
| Power limitation | 742.4655 | KW |

| Result | Value | Units |
|---|---|---|
| Old total oil | 3644.347545441... | BPD |
| Old total water | 39129.59990093... | BPD |
| Old total power | 742.4654831124... | KW |
| New total oil | 3649.1265658323 | BPD |
| New total water | 38986.26159726... | BPD |
| New total power | 742.4654959182 | KW |

Step 1: set up limits    Download APC model

Step 2: optimization    Close (1) This simulation assumes well condition like WC and GOR will not vary as we increase frequency
(2) This simulation assumes no water coning and gas coning issue as we increase frequency
(3) Please consult with application engineer and customer before applying the changes on freq/ptbg 400
402
404
406

FIG. 4

INDUSTRIAL MACHINE OPTIMIZATION

BACKGROUND

Artificial lift mechanisms such as Electrical Submersible Pumps (ESPs), Rod Lift Systems, etc., can be used to extract oil from conventional and unconventional sources. Production of oil from ESP wells can be optimized for each well individually. Production engineers can rely on judgment and experience to go through an iterative process to optimize wells individually while ensuring that cluster level constraints are not violated. This process can be cumbersome and may not result in the maximum production of oil across the wells in the cluster.

In addition, software applications currently used by oil and gas personnel may be desktop-based. Few applications work on mobile devices of different form. Because computing resources available on desktops can be limited, certain optimization algorithms can take longer than a user may be willing or able to wait. In some cases, the algorithms can be scheduled to run in the background. Users can be notified when optimization potential crosses a pre-defined threshold. Due to limited availability of computing resources on desktop environments, software packages can be unable to provide a desirable user experience. Additionally, well models may be calibrated on an ad-hoc basis, resulting in the optimization being performed with uncalibrated well models.

SUMMARY

Various aspects of the disclosed subject matter may provide one or more of the following capabilities. The oil field monitoring system can improve/alter the production of oil, water, and/or gas of an oil well cluster in an oil field by controlling the operating parameters of an oil pump in the oil well cluster. The monitoring system can provide the user with recommendations. For example, based on system constraints (e.g., operating envelop), an optimization method (e.g., linear programming) can recommend operating parameters (e.g., a new set of ESP Frequency for a cluster of ESPs) that can improve (e.g., maximize) oil production. The monitoring system can also simulate crude oil production based on inputs provided by the user.

In one implementation, a method can include receiving historical data characterizing a detected operational characteristic of a first industrial machine of a plurality of industrial machines in a cluster. The method can also include determining an operational envelop associated with the first industrial machine from the historical data. The operational envelop can be indicative of a range of values of an operating parameter of the first industrial machine. The method can further include determining an operating parameter recommendation, the determining can include using the operational envelop and a user input as operational constraints associated with one or more of the plurality of industrial machines. The method can also include rendering, in a graphical user interface display space, a visual representation of the operating parameter recommendation.

One or more of the following features can be included in any feasible combination.

In one implementation, determining the operational envelop can include identifying at least one of a first detected operational characteristic value and a second detected operational characteristic value from the historical data. The first and the second detected operational characteristic value can be indicative of a predetermined range of characteristic values of the first industrial machine. The determining of the operational envelop can further include calculating at least one of a first envelop value of the operational envelop corresponding to the first detected operational characteristic value, and a second envelop value of the operational envelop corresponding to the second detected operational characteristic value. In another implementation, calculating the first envelop value can include varying an input of a digital model characterizing the plurality of industrial machines based on difference between a previous output of the digital model and the first detected operational characteristic value.

In one implementation, the method can further include rendering, in the graphical user interface display space, an interactive graphical object characterizing the user input value. The method can also include receiving data characterizing user interaction with the interactive graphical object. The data characterizing the user interaction can be indicative of the user input value. The method can further include updating the digital model based on the user input value and the operational envelop. In another implementation, updating the digital model can include calculating one or more system coefficients associated with the plurality of industrial machines. In yet another implementation, a characteristic mathematical representation comprising a system of equations can calculate the one or more system coefficients based, at least in part, on the operating envelop and the user input value.

In one implementation, the method can further include generating the digital model, the generating can include determining one or more coefficients of a characteristic equation of the first industrial machine based on sensor data detected by one or more sensors operatively coupled to the first industrial machine. In another implementation, the historical data can be detected by one or more sensors coupled to the first industrial machine. In yet another implementation, the plurality of industrial machine can include one or more of a crude distillation unit, control valves, a reservoir, a casing unit, pumps and tubing unit. In another implementation, the method can further include transmitting, to a controller of the first industrial machine, an instruction to modify operation of the first industrial machine based on the operating parameter recommendation.

In one implementation, the method can further include determining a second operational envelop associated with the first industrial machine from the historical data. The operational envelop can be indicative of a second range of values of a second operating parameter of the first industrial machine. Determining the operating parameter recommendation can include using the second operational envelop as a second operational constraints associated with one or more of the plurality of industrial machines.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Production of crude oil (or natural gas and/or water) from a well, such as an oil well cluster, can be improved by changing the operation of oil pumps in the oil wells of the cluster. Changing the operation of the pumps can include changing, for example, operating parameters of the oil wells (e.g., speed/frequency of rotation of motors in the oil pumps, pressure at well head controlled by a valve at the well head, and the like). But trying to improve the oil production of the cluster by manually varying the operating parameters of one or more oil pumps can be cumbersome. For example, it can be challenging to improve/vary the oil production of the cluster if there are constraints associated with the individual pumps in the cluster (e.g., desirable operating parameters of the pumps) and/or constraints associated with the cluster (e.g., energy consumed by the oil pumps in the cluster, total oil generated by the cluster, and the like). A monitoring system can allow for improving (e.g., optimizing) oil production of a cluster by controlling operations of pumps in the cluster based on pump constraints and/or cluster constraints. Pump constraints for a given pump can be based on historical operational data of the pump. Including pump constraint (e.g., based on historical data) while determining (e.g., optimizing) desirable operating parameters of the pump can improve the durability and lifetime of the pump, and can allow for improvement in oil production.

Historical operational data of a pump (e.g., pump torque data) can be indicative of desirable (e.g., normal) operation of the pump. Based on historical operation data, a range of values of an operating parameter ("operating envelop") can be calculated. In one implementation, this can be done, by using an iterative algorithm in tandem with a digital model of the pump. The digital model can take an operating parameter of the pump (e.g., pump frequency) as an input and generate operating characteristic of the pump (e.g., pump torque). The iterative algorithm can vary the input operating parameter values of the digital model until the output pump characteristic converges to a desirable value (e.g., a historical operating characteristic value). For example, the input pump frequency can be varied (e.g., iteratively varied) to get pump torque values that correspond to the historical pump torque values (e.g., within a predetermined convergence value). By repeating this operation for multiple historical operating characteristic values, the operating envelop can be obtained. The operating envelop (e.g., of pump frequency values) can be used as a constraint when improving (e.g., optimizing) operation of a cluster (e.g., for optimizing oil production). For example, during a what-if analysis, operating envelop can be used as an additional constraint in the optimization process (e.g., in addition to cluster constraint such as cluster water production, cluster power consumption and the like). In some implementations, multiple operating envelops can be calculated (e.g., from multiple datasets in the historical data). This can be done, for example, by iteratively varying multiple input operating parameters of the pump for multiple operating characteristics. For example, operating frequency can be obtained from historical data of pump torque, surface tubing pressure can be obtained from historical data of motor oil temperature, etc.

The monitoring system can include an intuitive interface that can allow an operator to interact with the monitoring system. For example, the operator can simulate changes in how the oil wells in the cluster would operate if the operator changed cluster constraints and/or operating parameters of the oil pumps in the cluster. The simulations can include constraints for one or more pumps based on historical data. The user can remotely alter oil well operation, such as altering the operation of the pump. This remote modification of the oil well can be based on the hypothetical change in operation used in the simulation. Other embodiments are within the scope of the present disclosure.

Figure 1:
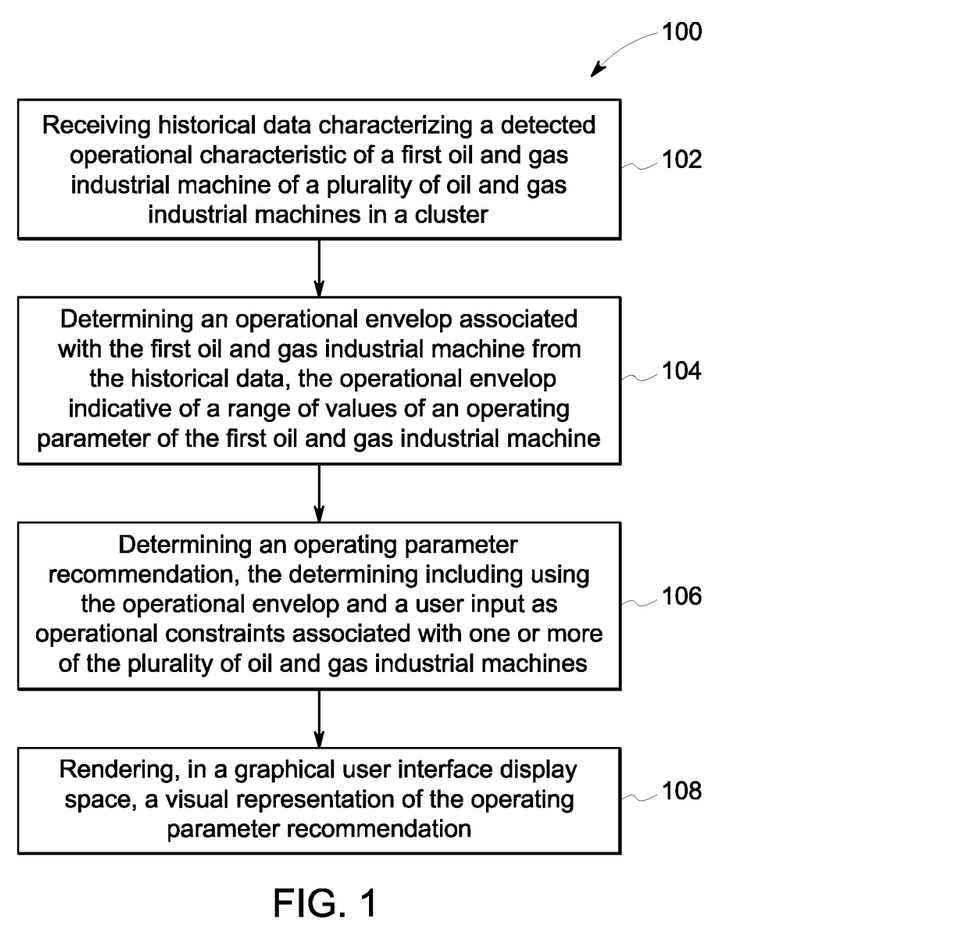
FIG. 1 is a flow chart of an exemplary method for monitoring and managing the operation of an oil well cluster.

FIG. 1 is a flow chart of an exemplary method for monitoring and managing the operation of an oil and gas industrial machine (e.g., oil pumps) associated with an oil well cluster ("cluster"). An oil well cluster can include multiple oil wells (e.g., oil wells that are in geographical proximity, share a common feature, etc.). Oil well clusters (e.g., ESPs in the oil well cluster) can share infrastructure for power and total flow handling capability that impose cluster-level constraints that can be factored into the optimization process.

Figure 2:
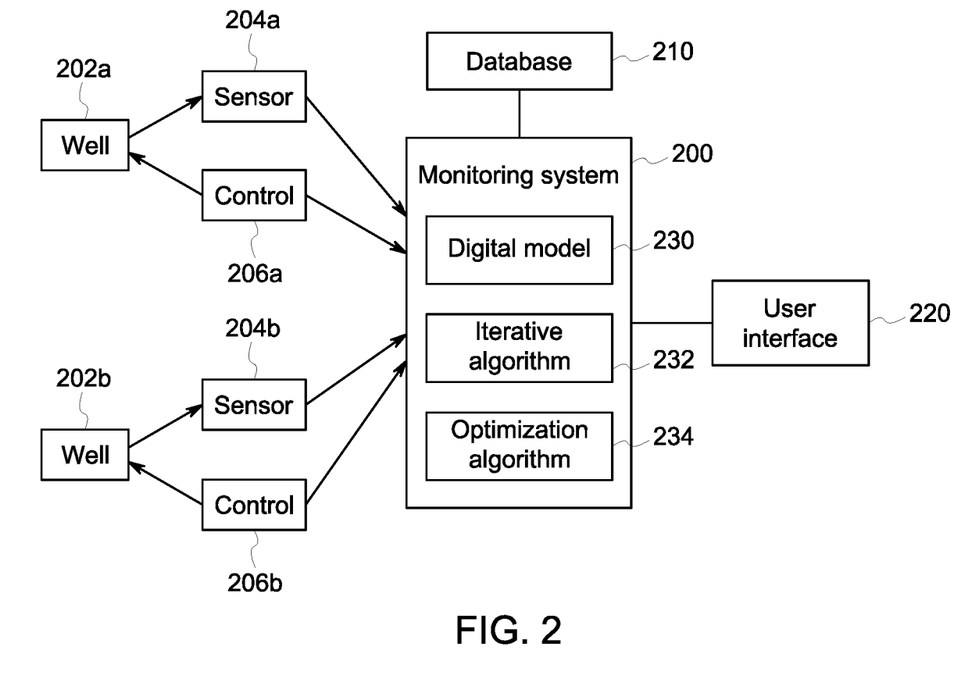
FIG. 2 is a schematic illustration of a monitoring system that can monitor and control the operations of oil wells in a cluster.

At 102, historical data characterizing a detected operational characteristic of a first oil and gas industrial machine (hereinafter referred to as "pump") of a plurality of oil and gas industrial machines in a cluster can be received. As illustrated in FIG. 2, a cluster of oil wells can include multiple oil wells (e.g., oil wells 202a, 202b, etc) and the various oil wells can include a pump for extracting oil, water, gas, etc. The monitoring system 200 can receive historical data associated with the pumps in the cluster. The historical data can include operational characteristics (e.g., torque speed, power consumed, water generated, etc.) of the various pumps in the cluster. The historical data can be generated based on previous detection by the sensors (e.g., sensor 204a, 204b, etc.) associated with the pumps in the cluster. The historical data can include metadata associated with the various operational characteristic values. For example, the metadata can indicate an identity associated with the characteristic value (e.g., characteristic value represents a torque measurement), identity of the pump associated with the characteristic value, operating state of the pump at the time of measurement, alarms associated with the pump at the time of measurement, etc. Metadata can include, for example, descriptive metadata that describes the source of the historical data, reference metadata that describes the content of the historical data, etc.

At 104, an operational envelop associated with the pump can be determined from the historical data. The operational envelop can be indicative of a range of operating parameter values that may be desirable for the operation of the pump. In other words, operating the pump with operating parameter values in the operational envelop can improve the durability and/or performance of the pump (e.g., by reducing stress, strain, etc. on the pump).

The monitoring system 200 can include a processor that can execute a digital model 230 (e.g., a digital model of the pump or multiple pumps in the cluster) that can determine operating characteristics of the pump from the operating parameters of the pump. The digital model can be used to determine operating parameter recommendation (e.g., the range of desirable operating parameters) for the operation of one or more pumps, and/or for the operation of the entire cluster. In one implementation, the digital model can include characteristic equation (or system of characteristic equations) of one or more pumps in the cluster. The characteristic equation can model/predict operating characteristics of the pumps in the cluster. The characteristic equation can include one or more system coefficients (e.g., predetermined coefficients related to the pump and/or sensors associated with the pump). The digital model can be created/calibrated by varying/updating the system coefficient. In some implementations, the digital model can be generated from measurement of pump characteristics (e.g., pump intake pressure, pump discharge pressure, motor amps, etc.) by sensors operatively coupled to the pump. The sensor measurements (also referred to as scada measurements) can be used in real-time to generate the digital model (e.g., to calculate coefficient of the characteristic equation in the digital model). Once the digital model of the pump has been created, sensor measurements can be used to update the digital model (referred to as "calibration"). For example, coefficient in the characteristic equation can be updated.

The digital model 230 can receive an operating parameter value and calculate the corresponding operating characteristics based on the operating parameter value. For example, the digital model 230 can receive pump frequency as an input and calculate pump torque as an output. The inverse operation of determining an operating parameter value from an operating characteristic value (e.g., from historical data in a database) can be achieved, for example, through an iterative process. In one implementation, the monitoring system can include an iterative algorithm 232 that can make an initial guess of an input operating parameter value and calculate the corresponding operating characteristic ("calculated operating characteristic"). The iterative algorithm 232 can calculate the difference between the calculated operating characteristic value and a historical operating characteristic value ("target operating characteristic"). Based on the difference between the calculated operating characteristic and the target operating characteristic, the iterative algorithm 232 can determine a revised input operating parameter value, and the digital model 230 can calculate a revised calculated operating characteristic. These steps can be repeated until the difference between the calculated operating characteristic and the target operating characteristic is below a predetermined convergence threshold value.

The monitoring system can identify target operating characteristic values from the historical data that correspond to desirable operation of the pump. This can be done, for example, based on the metadata of the historical operating characteristic values. For example, the monitoring system can identify operating characteristic values that have an alarm status indicative of a normal operation of the pump. The monitoring system 200 can identify threshold operating characteristic values. For example, the monitoring system 200 can identify a high threshold of the operating characteristic (e.g., highest permissible torque values) and a low threshold of the operating characteristic (e.g., lowest permissible torque values). The high and the low threshold values of the operating characteristic can define a desirable range of operating characteristic value.

The iterative algorithm 232 can calculate a first operational envelop value by setting the high threshold value of the operating characteristic as the target operating characteristic (e.g., by the iterative process described above). Additionally or alternately, the iterative algorithm 232 can calculate a second operational envelop value by setting the low threshold value of the operating characteristic as the target operating characteristic. The first and the second operational envelop values can define the first operational envelop.

In some implementations, the iterative algorithm can calculate two or more operational envelop. For example, the iterative algorithm can calculate the first operational envelop and a second operational envelop. Based on the first and second operational envelop, a combined operational envelop can be calculated. For example, the combined operational envelop can include values that are present in both the first operational envelop and the second operational envelop (e.g., portion of the first and second operational envelop that overlap).

At 106, a recommendation including an operating parameter value (or a range of values of the operating parameter) for the pump can be determined. This can be done, for example, by an optimization algorithm 234 that can use the calibrated digital model for determining recommendation for operating parameter values. For example, the optimization algorithm can vary an input operating parameter (e.g., iteratively vary the input operating parameter) of the digital model so that an output of the digital model (e.g., oil production) is improved (e.g. maximized, optimized, etc.). The range of values of the input operating parameter can be limited by (e.g., chosen from) the operational envelop determined in step 104.

Calibration of digital model 230 can be based on, for example, characteristic of the oil wells (e.g., pump intake pressure, pump discharge pressure, etc.) detected by sensors (e.g., by sensors 204a, 204b, etc.) in the cluster. Constraints provided by the user can be related to a single well (e.g., permissible range of values for oil well operational parameters such as surface flowrate, bottomhole pressure, pump frequency, well head pressure, intake pressure, and the like) and/or multiple wells in the oil cluster (e.g., total production of oil, water, and/or gas by multiple oil wells, power consumed by multiple oil wells, and the like). In one implementation, calibration of a digital model of an oil well can involve recalculation of the system parameters of the characteristic equations (or system of characteristic equations) used in the digital model. For example, calibrating a digital model can include updating coefficients in the characteristic equation.

In some implementations, the optimization algorithm 234 can include a linear programming algorithm. The linear programming algorithm can set the first and the second operational envelop values as constraints during the optimization process. In some implementations, the optimization algorithm 234 can include a genetic algorithm. The genetic algorithm can constrain a mutation step based on values in the operating envelop. For example, while setting up a chromosome during the mutation step, changes in frequency steps between adjacent iterations can be locked to one or more values in the operating envelop.

Figure 3:
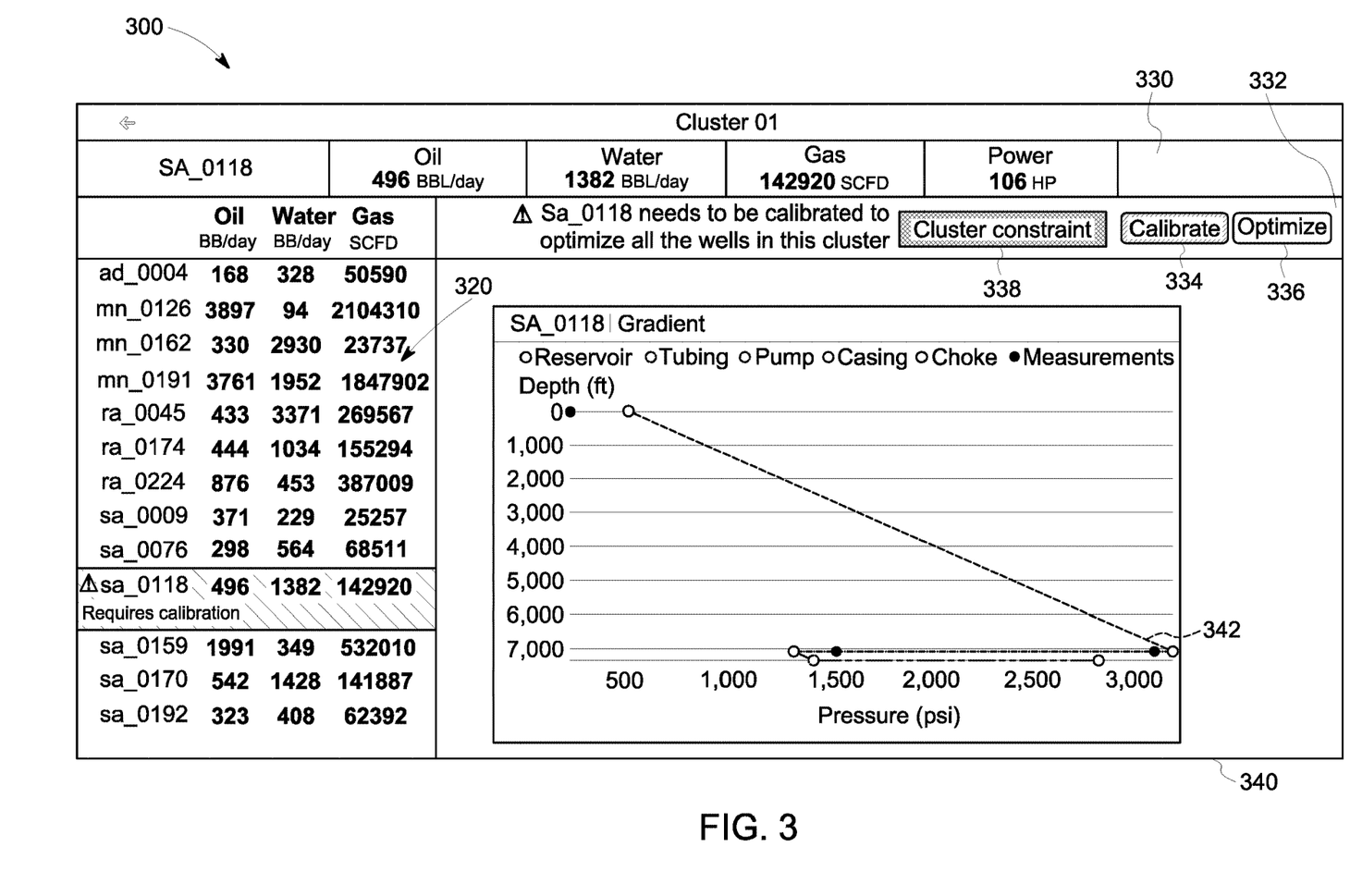
FIG. 3 illustrates an exemplary graphical user interface (GUI) display of the monitoring system in FIG. 2.

FIG. 3 is an illustration of an exemplary GUI display 300. A user can provide an input via the GUI display (e.g., via interactive objects in the GUI display). Based on the user input and/or the operational envelop, an operating parameter recommendation value (or range of operating parameters values) for one or more pumps in the cluster can be determined. The optimization algorithm 234 can vary an input operating parameter (e.g., iteratively vary the input operating parameter) of a digital model (e.g., updated digital model) so that an output of the digital model (e.g., oil production) is improved (e.g. maximized, optimized, etc.). In one implementation, the digital model 230 can be updated by updating the one or more system coefficients of the characteristic equation (or system of characteristic equations) with new system coefficients. The new system coefficients can be determined based on sensor data (e.g., sensor operatively coupled to the oil and gas industrial machine). The newly generated set of system constants can be used for determining operating parameter recommendation and/or pump characteristics (e.g., variable speed pump curve, gradient curve and input performance relation (IPR) curve based on one or more of surface flowrate, bottomhole pressure, pump frequency, well head pressure, intake pressure, and the like).

GUI display 300 can include visual representation of characteristics of oil wells in the cluster (e.g., a plot of one or more pump characteristics of one or more pumps calculated by the digital model 230). FIG. 3 includes a vertical taskbar 320 that can includes information related to various oil wells of a cluster (e.g. names of the wells in the cluster, information related to the amount of oil, water and gas produced by the oil wells, etc.) This information can be based on detection by sensors at the oil wells.

The vertical taskbar can also indicate if an oil well 310 (e.g., well labelled "sa_0118") needs to be calibrated. For example, a visually distinct warning sign (e.g., "Requires Calibration" in red color) can be displayed in the vicinity of the name of the oil well in the vertical taskbar (e.g., when a well head pressure calculated by digital model 230) deviates significantly from the measured well head pressure, the digital model needs to be calibrated, etc). The GUI display 300 can also include a horizontal bar 330 that can display information about the oil cluster (e.g., oil cluster associated with the oil wells in the vertical taskbar 320). For example, the horizontal taskbar can include information related to oil, water, and/or gas produced by the cluster, the power consumed by the oil pumps in the cluster, and the like.

The GUI display 300 that can display user interactive graphical objects (e.g., calibrate icon 334, optimize icon 336, cluster constraint icon 338 and the like) in an input taskbar 332. The GUI display 300 can also include an information panel 340. A user can select the oil well whose information can be displayed in the information panel 340 (e.g., by clicking on the name of the oil well in the vertical taskbar 320). For example, the information panel 340 can include ESP frequency, depth, power consumption, water cut, Gas-Oil-Ratio (GOR), intake and exit pressures, etc., of the well SA_0118.

A user interaction with the interactive graphical object can include clicking on icon calibrate 334, icon optimize 336 or cluster constraint icon 338 by the user. Selecting the cluster constraint icon 338 can generate a constraint dialog box through which a user can provide/select constraints on the oil well cluster. The oil well cluster constraints can include, for example, total oil production, total water production and total power consumption by the cluster. Based on the constraint value provided/selected by the user, one or more digital models (e.g., digital models 230) for the oil well cluster can be updated (e.g., as described at step 106 of FIG. 1).

By clicking on the icon calibrate 334, the user can calibrate oil well information (e.g., oil well information displayed in the information panel 340). In some implementations, the monitoring system can determine that an oil pump requires calibration. For example, the monitoring system can compare the operating characteristics of the pump (e.g., obtained from sensors associated with the pump) and operating characteristics calculated by the monitoring system using the digital model of the pump. If the difference between the detected operating parameters and the calculated operating parameter is greater than a threshold value, a user can be alerted that the pump is not calibrated ("uncalibrated"). This can be done, for example, by visually distinguishing an icon associated with the uncalibrated pump in the vertical taskbar 320.

At 108, a visual representation of the operating parameter recommendation (e.g., pump frequency, new set of oil well system constants, oil well characteristics, etc.) can be rendered in the GUI display space 300. In some implementations, a calibrated curve 342 can be displayed in the information panel 340 that can be indicative of operational characteristics associated with the recommended operating parameter values.

The user can control the operation of one or more pumps/oil wells in the cluster based on the recommended operating parameter value (or range of operating parameter values). As illustrated in FIG. 2, a control system 206a (or 206b) can alter the operational parameters of the oil pumps associated with oil well 202a (or 202b), for example, by sending an instruction to modify operation of the oil pump (e.g., by changing the frequency of the pump). For example, the monitoring system 200 can transmit an instruction to the control system 206a (or 206b) to modify operation of oil well 202a (or 202b).

Figure 4:
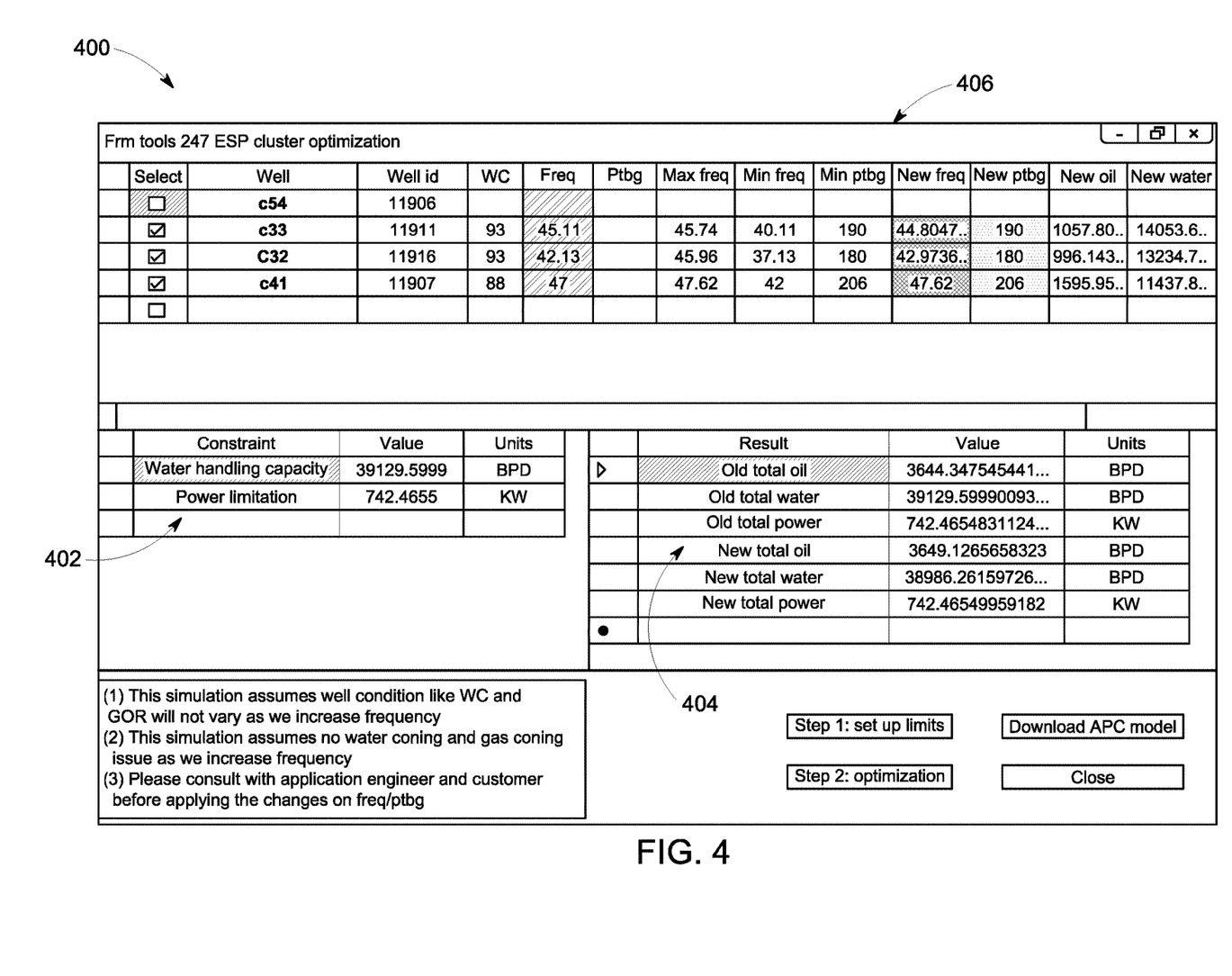
FIG. 4 illustrates an exemplary interactive GUI of the monitoring system in FIG. 2.

FIG. 4 illustrates an exemplary interactive GUI display space 400 of the monitoring system in FIG. 2. The GUI display space 400 can allow a user to vary input user constraint 402 (e.g., cluster constraint such as operating envelop) and view optimization results 404 generated by the monitoring system in FIG. 2 (e.g., based on the exemplary method described in FIG. 1). The GUI display space can display operating parameters 406 of the oil and gas industrial machine.

Improvement (e.g., maximization) of oil production in oil fields can involve optimization of operation of artificial lifts such as electrical submersible pumps (ESP), progressive cavity pumps (PCP), rod lift systems (RLS), and the like. For oil wells with ESPs, the key operational optimization parameters can include frequency of the pump and the well head pressure (WHP). Production from a well can be improved by varying the frequency of pump (e.g., to a maximum value) subject to inherent constraints of the artificial lift equipment such as motor, pump, and the like. However, it may not be possible or desirable to independently optimize each individual well (e.g., due to constraints on power consumed by multiple wells in the oil field, total water production, and the like). It can be desirable, to optimize multiple oil wells in a cluster (e.g., all the wells in the cluster or oil field) based on properties of the oil wells, and/or global constraints (e.g., related to multiple oil wells, oil cluster, oil fields, and the like) and operating envelops of one or more pumps.

In some instances, improving the oil production of the oil field can simultaneously optimize multiple wells while ensuring that no local or global constraints are violated (e.g., constraints related to operational envelop). Further, this methodology can accomplish the optimization of several wells in a very short period of time (e.g., in tens of seconds) that can allow the user to quickly take remedial action.

Some aspects of the current subject matter can provide a framework for optimizing/improving several wells and/or several clusters of wells (e.g., simultaneously) through a combination of physics based models and advanced optimization techniques. The current subject matter can provide many technical advantages. For example, this application can provide for an accelerated optimization methodology for improving (e.g., maximizing) oil production and improving the performance/longevity of pumps in the oil well. The digital models and the associated optimization techniques can optimize multiple oil wells very quickly (e.g., in tens of seconds). Further the optimization can take into account multiple (e.g., all) inherent constraints of the individual wells as well as global constraints, which can be imposed by the production engineer. This framework can help production engineers to improve (e.g., maximize) production under constraints, and/or can allow them to perform what-if analyses on scenarios in real-time. This framework can allow production engineers to quickly react to developments such as failures in particular wells and/or change in available power by running the what-if scenarios and identifying other wells that can be optimized to meet production targets. The framework can be used for hypothetical scenarios so that outage and maintenance activities can be scheduled while minimizing production losses Well constraints can include for example, operational envelop generated using historical data, an upper and a lower limit for oil generated by the well; an upper and a lower limit for water generated by/flowing from the well; an upper and a lower limit for well head pressure of the well; and an upper and a lower limit for the well pump frequency. Cluster constraints can include for example, an upper and a lower limit for oil generated by the cluster; an upper and a lower limit for water generated by/flowing from the cluster; an upper and a lower limit for power consumed by the cluster (e.g., by pumps in the cluster). Field constraints can include for example, an upper and a lower limit for oil generated by the field; an upper and a lower limit for water generated by/flowing from the field; an upper and a lower limit for power consumed by the cluster (e.g., by pumps in the field).

Some implementations of the current subject matter can provide many technical advantages. For example, optimization algorithms that optimize wells in a cluster without taking into account the historical operating characteristics of the wells can result in undesirable operation of the pump (e.g., reduced pump lifetime). As a result, these optimization algorithms may not be desirable. Further, in some implementations, the current subject matter can address and can improve (e.g., optimize) oil production while ensuring long-term health of the pump, which may not be possible using other approaches. Further, other approaches may require experts to optimize wells iteratively by trial and error and are generally slow and may not even result in a feasible solution. In some implementations, the current subject matter can have faster reaction time to contingencies in the field, and can the optimizations can be global in nature (e.g., over multiple oil wells).

Some implementations of the current subject matter can allow for optimal utilization of available resources in an oil field (like power) for improving (e.g., maximizing) oil production while preventing pumps from operating with undesirable operating parameters. This can lead to a reduction in down-time and production losses as users can run what-if analyses with specific production targets and constraints on individual wells.

Other embodiments are within the scope and spirit of the disclosed subject matter. For example, the monitoring system described in this application can be used in facilities that have complex machines with multiple operational parameters that need to be altered to change the performance of the machines (e.g., power generating turbines). Usage of the word "optimize"/"optimizing" in this application can imply "improve"/"improving."

Certain exemplary embodiments are described herein to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving historical data characterizing a detected operational characteristic of a first industrial machine of a plurality of industrial machines in a cluster;
   determining an operational envelop associated with the first industrial machine from the historical data, the operational envelop indicative of a range of values of an operating parameter of the first industrial machine;
   determining an operating parameter recommendation, the determining including using the operational envelop and a user input as operational constraints associated with one or more of the plurality of industrial machines; and
   rendering, in a graphical user interface display space, a visual representation of the operating parameter recommendation.

2. The method of claim 1, wherein determining the operational envelop includes:
   identifying at least one of a first detected operational characteristic value and a second detected operational characteristic value from the historical data, the first and the second detected operational characteristic value indicative of a predetermined range of characteristic values of the first industrial machine; and
   calculating at least one of a first envelop value of the operational envelop corresponding to the first detected operational characteristic value, and a second envelop value of the operational envelop corresponding to the second detected operational characteristic value.

3. The method of claim 2, wherein calculating the first envelop value includes varying an input of a digital model characterizing the plurality of industrial machines based on difference between a previous output of the digital model and the first detected operational characteristic value.

4. The method of claim 3, further comprising:
   rendering, in the graphical user interface display space, an interactive graphical object characterizing the user input value;
   receiving data characterizing user interaction with the interactive graphical object, the data characterizing the user interaction indicative of the user input value; and
   updating the digital model based on the user input value and the operational envelop.

5. The method of claim 4, wherein updating the digital model includes calculating one or more system coefficients associated with the plurality of industrial machines.

6. The method of claim 5, wherein a characteristic mathematical representation comprising a system of equations calculates the one or more system coefficients based, at least in part, on the operating envelop and the user input value.

7. The method of claim 3, further comprising generating the digital model, the generating includes determining one or more coefficients of a characteristic equation of the first industrial machine based on sensor data detected by one or more sensors operatively coupled to the first industrial machine.

8. The method of claim 1, wherein the historical data is detected by one or more sensors coupled to the first industrial machine.

9. The method of claim 1, wherein the plurality of industrial machines includes one or more of a crude distillation unit, control valves, a reservoir, a casing unit, pumps and tubing unit.

10. The method of claim 1, further comprising:
transmitting, to a controller of the first industrial machine, an instruction to modify operation of the first industrial machine based on the operating parameter recommendation.

11. The method of claim 1, further comprising determining a second operational envelop associated with the first industrial machine from the historical data, the operational envelop indicative of a second range of values of a second operating parameter of the first industrial machine,
wherein determining the operating parameter recommendation includes using the second operational envelop as a second operational constraints associated with one or more of the plurality of industrial machines.

12. A system comprising:
at least one data processor;
memory coupled to the at least one data processor, the memory storing instructions to cause the at least one data processor to perform operations comprising:
receiving historical data characterizing a detected operational characteristic of a first industrial machine of a plurality of industrial machines in a cluster;
determining an operational envelop associated with the first industrial machine from the historical data, the operational envelop indicative of a range of values of an operating parameter of the first industrial machine;
determining an operating parameter recommendation, the determining including using the operational envelop and a user input as operational constraints associated with one or more of the plurality of industrial machines; and
rendering, in a graphical user interface display space, a visual representation of the operating parameter recommendation.

13. The system of claim 12, wherein determining the operational envelop includes:
identifying at least one of a first detected operational characteristic value and a second detected operational characteristic value from the historical data, the first and the second detected operational characteristic value indicative of a predetermined range of characteristic values of the first industrial machine; and
calculating at least one of a first envelop value of the operational envelop corresponding to the first detected operational characteristic value, and a second envelop value of the operational envelop corresponding to the second detected operational characteristic value.

14. The system of claim 13, wherein calculating the first envelop value includes varying an input of a digital model characterizing the plurality of industrial machines based on difference between a previous output of the digital model and the first detected operational characteristic value.

15. The system of claim 14, wherein the operations further comprising:
rendering, in the graphical user interface display space, an interactive graphical object characterizing the user input value;
receiving data characterizing user interaction with the interactive graphical object, the data characterizing the user interaction indicative of the user input value; and
updating the digital model based on the user input value and the operational envelop.

16. The system of claim 15, wherein updating the digital model includes calculating one or more system coefficients associated with the plurality of industrial machines.

17. The system of claim 16, wherein a characteristic mathematical representation comprising a system of equations calculates the one or more system coefficients based, at least in part, on the operating envelope and the user input value.

18. The system of claim 14, wherein the operations further comprising generating the digital model, the generating includes determining one or more coefficients of a characteristic equation of the first industrial machine based on sensor data detected by one or more sensors operatively coupled to the first industrial machine.

19. The system of claim 12, wherein the historical data is detected by one or more sensors coupled to the first industrial machine.

20. The system of claim 12, wherein the plurality of industrial machines includes one or more of a crude distillation unit, control valves, a reservoir, a casing unit, pumps and tubing unit.

* * * * *